UNITED STATES PATENT OFFICE.

KARL L. TORNO, OF BERKELEY, CALIFORNIA, ASSIGNOR OF ONE-HALF TO FRANK R. SWEASEY, OF SAN FRANCISCO, CALIFORNIA.

COMBINED CEMENT.

1,342,360.  Specification of Letters Patent.  Patented June 1, 1920.

No Drawing.  Application filed March 26, 1918.  Serial No. 224,788.

*To all whom it may concern:*

Be it known that I, KARL L. TORNO, a subject of the Kingdom of Sweden, having received my first papers of citizenship in the United States of America, and a resident of the city of Berkeley, county of Alameda, and State of California, have made a new and useful Invention—to wit, a Combined Cement; and I do hereby declare the following to be a full, clear, concise, and exact description of the same.

The invention relates particularly to a modified cement having the characteristics of Portland cement, modified by the mixture therewith of dehydrated calcium sulfate and potassium sulfate, which is offered as a class identification only.

Among the objects of this invention are to produce a new cement of the character above described that will attain its ultimate strength or cure within the minimum of time and that is stronger, more elastic, more durable and cheaper in cost of production than Portland cement.

The United States Bureau of Standards has established the following as an analysis of a standard Portland cement:

| | |
|---|---|
| Silica ($SiO_2$) | 21.35% |
| Iron ($Fe_2O_3$) | 3.35% |
| Alumina ($Al_2O_3$) | 6.64% |
| Lime (CaO) | 62.20% |
| Magnesia (MgO) | 1.39% |
| Sulfuric anhydrid ($SO_3$) | 1.32% |
| Ignition loss | 2.69% |

Broadly stated, for example, the combined cement is produced by adding to 99 pounds of dehydrated calcium sulfate, one-half pound of aluminum sulfate, and one-half pound of potassium sulfate, or about one-half of one per cent. of each in the desired proportions and mixing about half and half with Portland cement. A greater or less proportion of Portland cement may be used in the mixture.

The chemical reactions follow the addition of water or other proper liquid to form a cementitious mass.

Cement formed in accordance with this invention is not dependent upon the exact formulas either of the Portland cement or of the modifying agent. It follows, however, that the higher the quality of each, the higher the resultant quality of the combined product forming the subject of this invention.

In this specification the invention is embodied in the form considered to be the best, but it is to be understood that the invention is not limited to such form because it may be embodied in other forms, and it is also to be understood that in and by the claims following the description it is desired to cover the invention in whatever form it may be embodied.

This combined cement is preferably produced substantially as follows:

To one part of dry Portland cement is added either two, three, or four parts or any proportion of a mixture of dry dehydrated calcium sulfate and potassium sulfate, according to the ultimate characteristic required of the mixture. These dry comminuted powders, both of which have been reduced to a high state of pulverization, the dehydrated calcium sulfate and potassium sulfate particularly being reduced to an impalpable powder, are mechanically mixed in any suitable manner until the particles of each are uniformly distributed throughout the mass.

This composite cement, composed of Portland cement and dehydrated calcium sulfate and potassium sulfate, is then combined with liquid, aggregates of sand, crushed rock, fibrous fillers, and the like, as required in formulas calling for Portland cement only, being mixed dry or wet before mixing with the aggregates and water as is now common practice. Such cementitious masses or concrete are capable of hydraulic pressing, casting, molding, and shaping in accordance with common practice relating to mixtures involving Portland cement unmodified by the added calcium sulfate and potassium sulfate, but with the following improved chemical and mechanical results, that the mixture will set in from two to three hours, bind in 10 hours, and cure within 24 hours, as compared to the purely Portland mixtures which set in from 2 to 3 hours, bind in 10 hours, and require 28 days to cure, or reach their maximum strength. Such mixtures including the combined cement have the further advantage of being more elastic, more dense and have a tensile strength equal if not superior to neat or aggregate mixtures including only Portland cement, the tests ranging from 800 pounds per square inch upward for an average mixture. The best results have been achieved when the dehydrated calcium sulfate and potassium sulfate have been permitted to age about three weeks, or more, before mixing with the Portland cement.

It is well known that Portland cement cannot be used for plastering purposes, except upon fresh or wet surfaces, because of shrinkage and lack of adhesive qualities, and its disposition to crack when dry; and that dehydrated calcium sulfate and potassium sulfate cannot be used for any exterior plastering, but my new cement is distinguished from either of these ingredients by being successfully adapted for plastering upon any surface, whether exterior, interior, wet or dry.

Because of the perfect white color of the dehydrated calcium sulfate and potassium sulfate, they lighten the color tone when mixed with the darker Portland cement, and when mixed with white Portland cement a white mixture results susceptible to the formation of very faint tints, or the addition of any color values desired in the ultimate result.

As the present cost of producing Portland cement is approximately $6.25 per ton against $5.50 for the dehydrated calcium sulfate and potassium sulfate, the economy resulting from the combination of the two is manifest.

Having thus described this invention, what I claim and desire to secure by Letters Patent is:

1. A cement comprising Portland cement and dehydrated calcium sulfate and potassium sulfate combined substantially as herein described.

2. A cement comprising Portland cement, dehydrated calcium sulfate and potassium sulfate and aluminum sulfate combined as herein described.

3. A cement composition comprising Portland cement, dehydrated calcium sulfate, potassium sulfate and a liquid combined to form a cementitious mass.

4. A cement composition comprising Portland cement, dehydrated calcium sulfate, potassium sulfate, a suitable aggregate and liquid to form a cementitious mass as herein described.

5. A cement comprising Portland cement, dehydrated calcium sulfate, and potassium sulfate, the combined calcium sulfate and potassium sulfates being in greater porportion than said Portland cement in weight.

6. A cement composition comprising one part of Portland cement and two to five parts of a modifier composed of dehydrated calcium sulfate and potassium sulfate, and a liquid to form a cementitious mass.

7. The process of hastening the curing of cementitious masses containing Portland cement, consisting of mixing therewith dehydrated calcium sulfate, potassium sulfate and liquid in proportion to form a cementitious mass.

8. The process of modifying cementitious masses containing Portland cement, consisting of mixing therewith dehydrated calcium sulfate, and potassium sulfate and liquid.

In testimony whereof, I have hereunto set my hand at San Francisco, California, this 23rd day of February, 1918.

KARL L. TORNO.

In presence of—
  BALDWIN VALE,
  A. J. HENRY.